April 7, 1925. 1,532,383
J. E. CLELAND
METHOD OF MANUFACTURING GOODS OF INDIA RUBBER AND OTHER PLASTICS
Filed Jan. 17, 1923
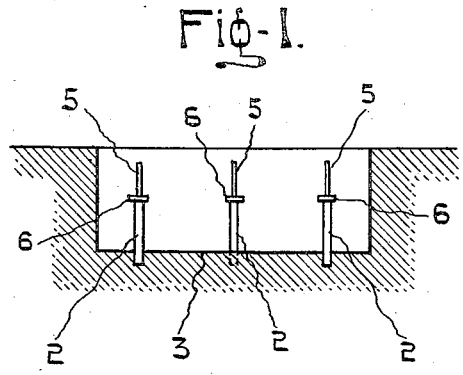
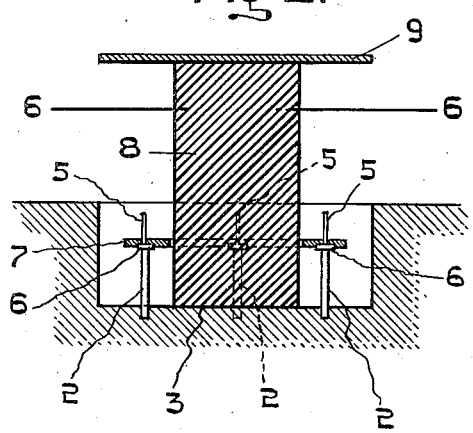
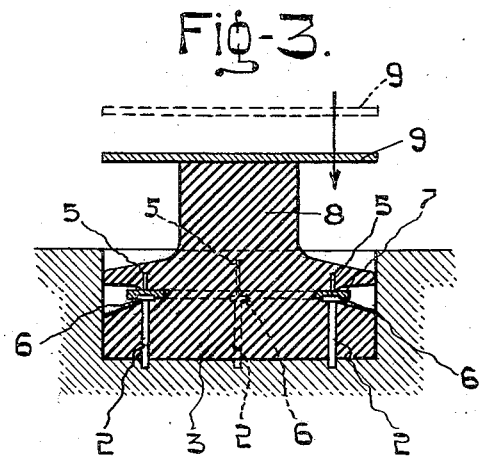
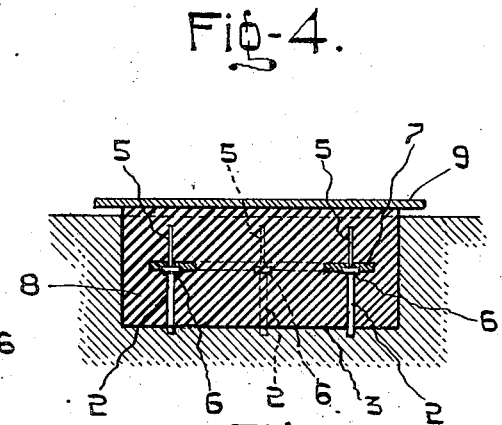
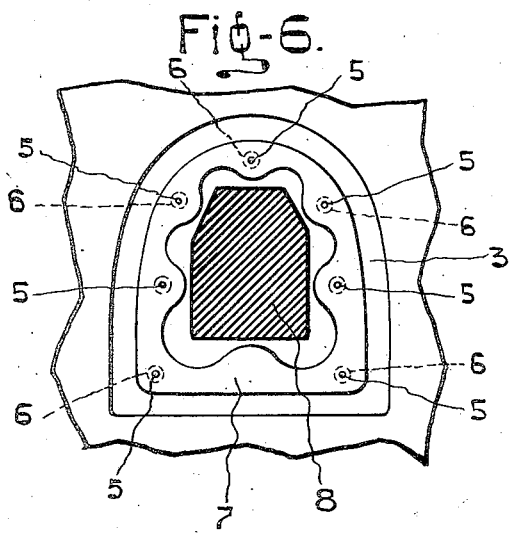
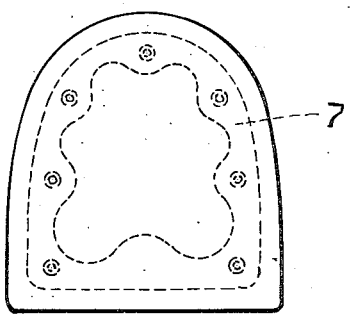
James E. Cleland.
Inventor,
Attorney.

Patented Apr. 7, 1925.

1,532,383

UNITED STATES PATENT OFFICE.

JAMES E. CLELAND, OF MONTREAL, QUEBEC, CANADA, ASSIGNOR OF ONE-HALF TO HARRY W. LUCAS, OF MONTREAL, CANADA.

METHOD OF MANUFACTURING GOODS OF INDIA RUBBER AND OTHER PLASTICS.

Application filed January 17, 1923. Serial No. 613,296.

*To all whom it may concern:*

Be it known that I, JAMES E. CLELAND, of the city of Montreal, Province of Quebec, Dominion of Canada, a subject of the King of Great Britain, have invented certain new and useful Improvements in Methods of Manufacturing Goods of India Rubber and Other Plastics; and I do hereby declare that the following is a full, clear, and exact description thereof.

My invention relates to the manufacture of rubber and rubberoid goods such as heels for boots and shoes, floor treads and sheet and block products generally and the invention relates particularly to goods of these classes in which a stiffening or attachment member is embedded in the body of the article.

The object of the invention is to provide a method of manufacturing articles of these classes by which the density of the article may be uniformly maintained throughout its mass; and by which the stiffening or attachment member may be firmly embedded in the body of the article in perfect alignment.

For full comprehension, however, of my invention, reference must be had to the accompanying drawings in which similar reference characters indicate the same parts, and wherein:

Figure 1 is a cross sectional view of a mold for carrying out my invention in the molding of a rubber heel;

Figure 2 is a similar view illustrating the stiffener or attachment member in position within the mold and a block of unvulcanized composition or gum also in position therein in readiness for the application of pressure upon the top thereof;

Figure 3 illustrates a further step in the process and illustrates the condition of the unvulcanized block after an initial pressure has been applied thereto;

Figure 4 illustrates the block completely filling the mold, the pressure operation having been completed;

Figure 5 illustrates the finished molded article; and

Figure 6 is a horizontal sectional view taken on line 6—6 Figure 2.

The accompanying drawings illustrate the manufacture of a heel for boots and shoes and the mold illustrated is typical of the molds employed in the manufacture of floor treads and other products, the dimensions of the mold being varied to meet requirements. In carrying out my process a number of vertically disposed studs 2 are positioned upon the bottom 3 of the mold with their upper ends disposed slightly below the horizontal plane of the top of the mold and of reduced diameter as indicated at 5 and provided with shoulders 6. These studs are adapted to support the stiffening or attachment member usually of metal and indicated at 7 which is to be embedded in the body of the molded article, the member having holes to enable it to be positioned upon the reduced upper ends of the studs as indicated in Figures 2, 3 and 4. The member which I prefer to employ in the manufacture of heels is of substantially annular form, its periphery conforming to the shape of the heel (see Figure 6) and its principal function is to provide an attachment plate through which the nails for securing the heel to the shoe are driven. It is to be understood, however, that the shape of this member may be varied to suit requirements without departing from the spirit of the invention. When the attachment plate or stiffener has been mounted in position upon the studs a block 8 of unvulcanized rubber or rubberoid composition of a cubic content sufficient to more than fill the mold is placed upon the bottom thereof within the attachment member as indicated in Figure 2 and a pressure plate 9 of greater area than that of the mold is placed upon the top of the block and pressure applied thereto in a downward direction. This pressure causes the unvulcanized block to flow outwardly above and below the member until the latter is firmly embedded therein and the mold is completely filled after which the article thus molded is vulcanized.

The advantages obtained with this process are that a molded product of uniform density throughout its mass is obtained and displacement of the stiffening or attachment member during the molding operation is prevented thereby securing a perfect alignment of the member within the finished product.

What I claim is as follows:

1. The method of manufacturing goods of the classes set forth consisting in positioning a series of upright studs within the mold, mounting a reinforcement member having a plurality of nail holes therein spaced a predetermined distance apart upon the upper ends of said studs with the upper ends of the studs extending through said holes, placing a block of unvulcanized rubber upon the bottom of the mold, the said block being of a cubic content sufficient to more than fill the mold and so applying pressure to the top of the block whereby the latter is caused to flow outwardly above and below the member and completely fill the mold.

2. The method of manufacturing heels from a plastic composition consisting in positioning a plurality of studs having shoulders adjacent their upper ends, in upright positions upon the floor of the mold, positioning an annular attachment plate upon the shoulders of said studs, positioning a block of heel composition upon the floor of the mold and within the plate and applying pressure upon the block whereby the composition is caused to completely surround the plate and fill the mold without disturbing the position of the plate.

3. The method of manufacturing heels consisting in supporting an attachment ring of annular form upon studs in the mold in position placed above the floor of the mold, placing a block of unvulcanized composition upon the floor of the mold within the ring, the cross section of the block being substantially uniform and less in measurement than the interior of the diameter of the ring and exerting downward pressure upon the top of the block through a plate of greater area than the matrix for the purpose of causing the composition to flow both under and over the ring and completely fill the mold without disturbing the position of the plate, and finally vulcanizing the heel thus molded.

4. The method consisting in mounting an attachment member in a mold on studs therein, and introducing a plastic compound into the mold under pressure in a manner in which the flow of the compound will simultaneously engage top and bottom sides of the member thereby equalizing the pressure on both sides of the attachment member and preventing displacement of the same.

In testimony whereof I have signed my name to this specification in the presence of two witnesses.

JAMES E. CLELAND.

Witnesses:
GORDON G. COOKE,
HARRIETTE McDONALD.